June 21, 1949.  E. L. DEETER  2,473,512
VOLTAGE CONTROL SYSTEM
Filed June 1, 1944
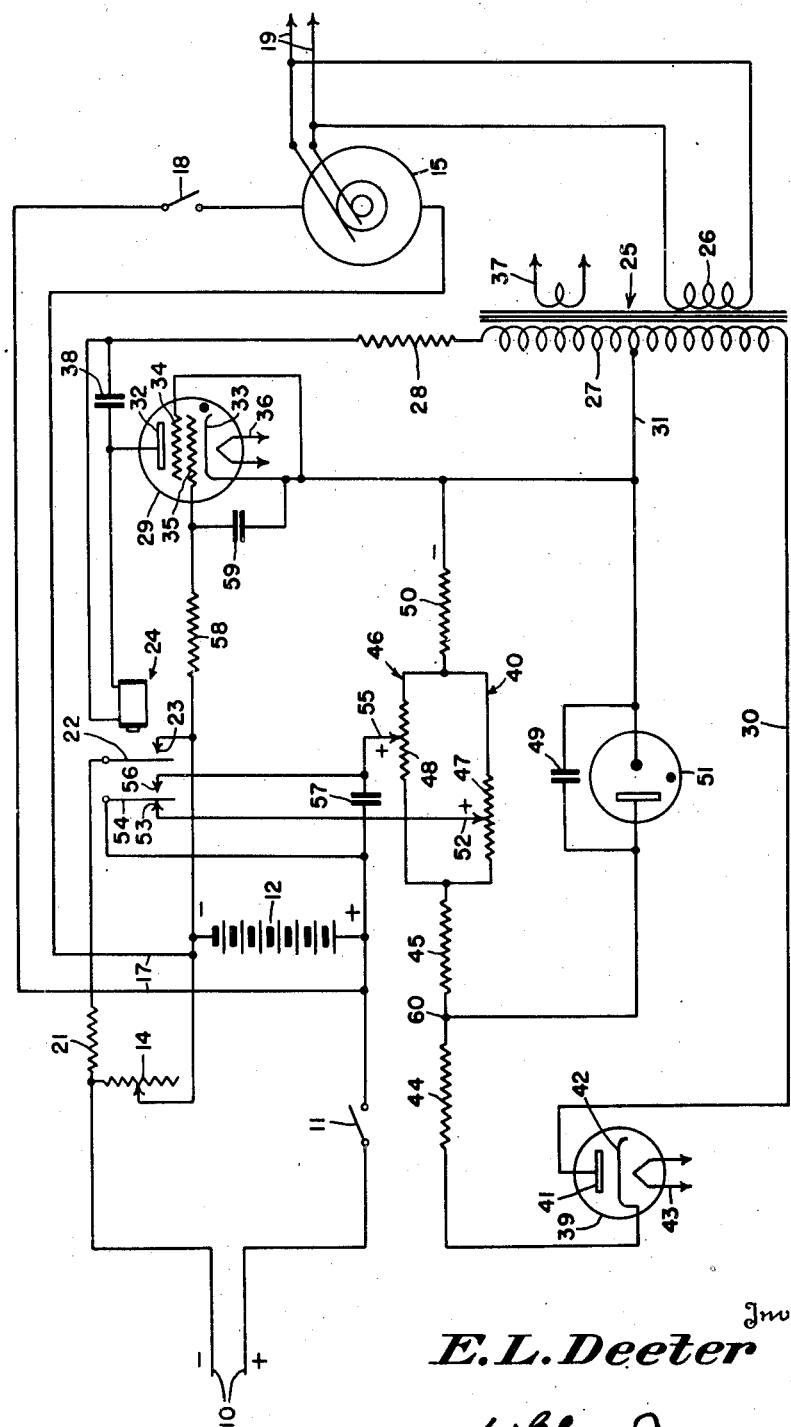
Inventor
*E. L. Deeter*
By W Glenn Jones
Attorney Patented June 21, 1949

2,473,512

UNITED STATES PATENT OFFICE 2,473,512

VOLTAGE CONTROL SYSTEM

Everett L. Deeter, Washington, D. C.

Application June 1, 1944, Serial No. 538,317

27 Claims. (Cl. 321—28)

(Granted under the act of March 3, 1883, as amended April 30, 1928; 370 O. G. 757)

This invention relates generally to a system of voltage regulation of the type wherein an electronic circuit is employed to control the charge and discharge cycle of a storage battery, thereby to maintain the terminal voltage thereof within predetermined limits.

More specifically, the present invention contemplates a regulated A. C. power supply for anti-torpedo systems employed in the protection of moving vessels against torpedo attack, in which systems a closely regulated A. C. power supply is required for the electronic circuits employed in the operation and testing of the systems. Such a system, for example, is disclosed in the copending application of Nelson N. Estes for Anti-torpedo system, Serial No. 517,201, filed 6 January 1944.

According to the invention, a storage battery is floated across the D. C. power line of the vessel at a reduction in voltage thereof, and the A. C. power is supplied by a rotary converter which operates as a D. C. load on the storage battery terminals. For this purpose, the battery is connected in series with one or more resistors across the D. C. power line, and regulation of the terminal voltage of the battery is obtained under control of an electronic circuit which operates automatically and selectively to connect to and disconnect from the battery, one or more of the aforesaid resistors when the battery voltage reaches the aforesaid predetermined limits respectively. As is well known, regulation of the A. C. power also is provided to a certain extent, under these conditions, by the battery itself, which tends to filter out line voltage change effects on the converter.

The rotary converter also is arranged to supply A. C. power to the aforesaid control circuit, which circuit comprises a grid controlled trigger tube of the gas thyratron type and a relay controlled thereby, the relay being energized and deenergized as the tube is fired and extinguished respectively. The relay is arranged to control the number of the aforesaid resistors connected to the battery at any time, thereby to control the effective value of the resistance in series with the battery and to cause the battery to be charged or discharged as the D. C. line respectively is caused to supply more or less of the D. C. power required by the rotary converter.

The character of the trigger tube is such that the firing and extinguishing of the tube is critical with respect to a bias of predetermined value applied to the grid thereof, the tube being fired when the bias thereon is increased positively to or beyond the critical bias value and the tube being extinguished when the bias thereon is increased negatively below said value. By reason of the fact that the tube conducts only on alternate half cycles of the A. C. power supplied thereto, a sharp cutoff or extinguishing of the tube is provided when the bias is decreased below the critical value, thus providing a positive release of the relay which prevents a chattering of the relay and pitting or burning of the contacts thereof as the relay releases. When current flows through the relay and tube, however, chattering of the relay is prevented by means of a condenser connected across the winding thereof.

The arrangement of the control circuit includes a pair of variable control voltage biases for the trigger tube, which biases respectively are applied to the tube during the charge and discharge periods of the battery and respectively comprise the storage battery and a pair of reference voltage sources selectively connectable in series opposing therewith by means of the aforesaid relay, the battery voltage, in each case providing the negative bias of the combination and being the effective voltage variable as the voltage of the battery rises and falls during the charge and discharge periods thereof.

The reference voltage sources are arranged to be adjustable at will to different settings in order that the control circuit may be adjusted to provide a desired regulation or range of variation of the battery voltage. In adjusting the control circuit for this purpose, the reference voltage source adapted to be connected to the battery during the discharge period thereof is adjusted such that the critical bias of the trigger tube is applied thereto when the battery voltage falls to the lower voltage limit defined by the voltage range. In like manner, the reference voltage source adapted to be connected to the battery during the charge period thereof is adjusted such that the critical bias of the trigger tube is applied thereto when the battery voltage rises to the upper voltage limit defined by the voltage range. Thus, in adjusting the control circuit for any desired voltage range of the battery, the reference voltage sources are adjusted such that the difference between each of the battery voltage limits defined by the desired range and the voltage values of each of the reference voltage sources respectively corresponding thereto is equal to the critical bias value of the trigger tube.

With the reference voltage sources adjusted as described in the foregoing, when the battery discharges and the voltage thereof falls to the lower voltage limit, the algebraic sum of the battery voltage and the voltage of the reference voltage source connected in series opposing therewith is equal to the critical bias voltage of the trigger tube. This bias being applied to the tube, the tube is fired, whereupon the relay operates to transfer the battery to the charging circuit therefor and to the reference voltage source comprising the control bias applied to the tube during the charge period of the battery.

Means are provided for maintaining the critical bias on the tube during the transfer operation of the relay, a different or more positive bias than the critical bias being applied to the tube when the transfer is completed, thereby providing a positive operation of the relay and maintaining the same in an operated condition as the tube conducts.

When the voltage of the battery rises to the upper voltage control limit thereof, the algebraic sum of the battery voltage and the voltage of the reference voltage source connected in series opposition therewith is equal to the critical bias voltage of the tube. This bias being applied to the tube, the tube is extinguished on the first additional rise in the battery voltage, whereupon the relay is deenergized and the battery is transferred to the discharge circuit therefor and to the reference voltage source comprising the control bias applied to the tube during the discharge period of the battery, a different or more negative bias than the critical bias being applied to the tube when the transfer is completed.

The reference voltage sources are derived from the A. C. power supply provided by the rotary converter, the A. C. power, for this purpose, being rectified and regulated in a well known manner.

An object of the invention is to provide a regulated A. C. power supply from a D. C. power line by means of a rotary converter in which the converter operates from a storage battery floated across the D. C. line and in which an electronic control circuit is provided for maintaining the voltage of the battery within predetermined limits.

Another object in a system of voltage control in which a storage battery is floated across a D. C. power line is the provision of a new and improved electronic circuit for maintaining the voltage of the battery within predetermined limits.

Another object in a system of voltage regulation is the provision of a grid controlled trigger tube for controlling the charge and discharge cycle of a storage battery in which the battery voltage is utilized as the effective voltage variable of the control bias applied to the tube.

Another object of the invention is the provision of a grid controlled trigger tube and a relay controlled thereby for transferring a storage battery between charge and discharge circuits therefor and for transferring the tube selectively between a pair of different control biases therefor adapted to maintain the voltage of the battery supply within predetermined limits.

A further object is the provision of a pair of variable control biases for a grid controlled trigger tube adapted to maintain the voltage of a storage battery within predetermined limits in which the biases comprise the battery and a pair of different reference voltage sources selectively connected in series opposition therewith.

A still further object in an electronic control circuit for maintaining the voltage of a storage battery within predetermined limits is the provision of a grid controlled trigger tube in which the firing and extinguishing of the tube is critical with respect to a bias of predetermined value applied thereto and in which means are provided for changing the bias on the tube to values different from the critical bias thereon when the tube is fired and extinguished respectively.

A still further object in an electronic control circuit for maintaining the voltage of a storage battery supply within predetermined limits is the provision of a critically biased trigger tube and a pair of different reference voltage sources in which the reference sources comprise a pair of variable control biases adapted selectively to be applied to the tube when the voltage of the battery reaches the predetermined limits and in which the critical bias value of the tube is equal to the difference between each of the predetermined voltage limits and the voltage values of each of the reference voltage sources respectively corresponding thereto.

Still another object in an electronic circuit for controlling the charge and discharge cycle of a storage battery is the provision of a critically biased trigger tube and a pair of different reference voltage sources comprising a pair of variable control biases therefor in which the voltage values of the reference voltage sources with respect to the critical bias voltage of the tube determine the range of voltage variation of the storage battery during the charge and discharge periods thereof.

An additional object in an electronic circuit for controlling the charge and discharge cycle of a storage battery is the provision of a critically biased trigger tube and a pair of different reference voltage sources in which the voltage values of the reference sources with respect to the critical bias voltage of the tube determine the range of voltage variation of the battery and in which the reference voltage sources are adapted to be adjusted at will to different settings, thereby to adjust the range of voltage variation.

Still other objects and advantages of the invention, not specifically set forth hereinabove, are those inherent in or implied from the novel combination and arrangement of parts as will become more clearly apparent from a consideration of the following detailed description, reference being had to the accompanying drawing in which the single figure thereof diagrammatically illustrates a voltage control system according to a preferred embodiment of the invention.

Referring now to the drawing for a more detailed description of the invention, the numeral 10 designates a D. C. line or power input source suitable for the purpose such, for example, as the 110 volt D. C. power line of a vessel. The positive side of the D. C. line 10 is connected by way of a power switch 11 to the positive side of a storage battery 12, the negative side of the battery being connected to the negative side of line 10 by way of an adjustable resistor 14. The battery 12 may have any terminal voltage suitable for the purpose such, for example, as 32 volts. The D. C. power thus rendered available at the terminals of the battery 12 from the battery and from the D. C. line is supplied to a rotary converter 15 by way of an obvious circuit which includes the conductors 17 and any suitable power switch 18.

The rotary converter 15 may be of any type adapted to provide at the output line or load circuit 19, A. C. power suitable for the purpose such, for example, as the 115 volt A. C. power required by an anti-torpedo system employed in the protection of the aforesaid vessel. In order to maintain the potential of A. C. line 19 constant at 115 volts with substantially no deviation therefrom as required by the electronic circuits of the anti-torpedo system, the voltage of the D. C. power supplied to the converter is maintained within predetermined limits by the provision of an electronic control circuit for controlling the charge and discharge cycle of the storage battery 12.

The battery 12 is caused to discharge by reason of the resistor 14 which may be adjusted to a value such that the battery supplies a predetermined percentage of the D. C. power required by the rotary converter 15, the remaining power being supplied by the D. C. line 10. In order to cause the battery to charge from the D. C. line, an additional resistor 21 is arranged to be connected therebetween in parallel with the resistor 14, thereby effectively to decrease the value of the resistance in series with the battery and to cause the line to supply the entire current required by the rotary converter and to supply a predetermined value of charging current to the battery. Thus, by reason of the foregoing connections, the battery is floated across the D. C. line 10 at a reduction in voltage thereof and is caused to charge and discharge when resistor 21 is connected and disconnected to and from the battery respectively.

The aforesaid electronic control circuit comprises a relay 24, which relay, when energized, is arranged to connect the resistor 21 to the battery, one end of the resistor 21 being connected directly to the negative side of the line 10. For this purpose, the relay 24 comprises a pair of normally open contacts 22, 23, which contacts respectively are connected to the resistor 21 and the battery 12.

The power for energizing relay 24 is supplied by a transformer 25, the primary winding 26 of which is connected by way of an obvious circuit to the A. C. power line 19 and the secondary winding 27 of which is connected by way of a current limiting resistor 28 to one side of the winding of relay 24. The other side of the relay winding is connected by way of an electron discharge device 29 to a center tap 31 provided on secondary winding 27.

The energization of relay 24 is controlled by the device 29 which, for the purpose herein, may be a grid controlled trigger tube of the gas thyratron type. The trigger tube 29 comprises a plate or anode 32, a cathode 33, a suppressor grid 34 connected to the cathode in a well known manner, a control grid 35, and a heater or filament 36 which may be connected in any conventional manner to the secondary winding 37 of transformer 25, which winding comprises a suitable energy source for the filament.

The flow of current through the trigger tube 29 is controlled by the bias applied to the control grid 35 thereof. The character of the trigger tube is such that the tube is triggered or fired when the bias on the control grid decreases negatively and reaches or exceeds a predetermined value, which predetermined or critical value is three volts negative with respect to the cathode of the tube, for example, and the tube is extinguished when the bias on the control grid thereof increases negatively to a value which is more negative than the predetermined critical value. Thus, the firing and extinguishing of the tube is rendered critical with respect to a bias of predetermined value applied to the control grid thereof.

When the trigger tube is fired, the resistance thereof is reduced to an extremely low value and a relatively large current passes through the relay 24 and through the tube, the current limiting resistor 28 being employed to protect the tube against excessive current flow therethrough. The current flow through the tube, which flow occurs every alternate half cycle of the A. C. power supplied by the secondary winding 27 when the tube conducts, makes possible a sharp cutoff or extinguishing of the tube when the bias thereon is negatively increased beyond the critical value. In order to prevent the contacts of relay 24 from chattering by reason of the half cycle surges of current passed through the winding of the relay, an electrolytic condenser 38 is connected between the plate 32 of trigger tube 29 and the limiting resistor 28.

Power from the secondary winding 27 is also applied to a single phase half-wave rectifier 39 which comprises a plate 41, a cathode 42, and a heater or filament 43 which may be connected in any conventional manner to secondary winding 37 which comprises a suitable energy source for the filament. The current rectified by the tube 39 flows from the lower side of secondary winding 27 as viewed in the drawing, through a conductor 30, plate 41 and cathode 42 of the rectifier tube 39, series resistors 44 and 45, the series parallel combination provided by the potentiometers 47, 48 and thence through a resistor 50 to the center tap 31 on secondary winding 27.

The ripples from the rectified current output of the rectifier tube 39 are smoothed and substantially removed by a filter or condenser 49 connected between the points 60 and 31 in the rectifier circuit, and the voltage between these points is maintained within very narrow limits by means of a glow discharge voltage regulation tube 51 likewise connected therebetween. As will appear in greater detail hereinafter, the voltage between the wiper 52 of potentiometer 47 and the cathode 33 of trigger tube 29 and the voltage between the wiper 55 of potentiometer 48 and cathode 33 comprise a pair of reference voltage sources generally designated 40 and 46 respectively. The voltage sources 40, 46 comprise the fixed bias portions of variable control biases adapted selectively to be applied to the grid 35 of trigger tube 29 during the discharge and charge periods of the battery supply 12 respectively.

For this purpose, the wiper 52 of potentiometer 47 is connected by way of the normally closed contacts 53, 54 of relay 24 to the positive side of battery 12, and wiper 55 of potentiometer 48 is similarly connectable to the positive side of the battery by means of the normally open contacts 56, 54 of the relay, an electrolytic condenser 57 being employed operatively to couple the wiper 55 to the battery when the movable contact 54 of the relay moves between the fixed contacts 53, 56 thereof. Thus, by reason of the foregoing connections, the reference voltage source 40 is connected to the battery 12 in series opposition therewith when the relay 24 is in a non-energized condition, and the reference voltage source 46 is connected to the battery 12 in series opposition therewith when the relay 24 is energized, this latter connection effectively being established by the condenser 57 as the contact 54 moves between fixed contacts 53 and 56 when the relay is energized.

The negative side of the battery 12 is connected to the control grid 35 of trigger tube 29 by way of a resistor 58, and the control grid is coupled to the cathode 33 thereof by means of a condenser 59. Thus, the effective bias on the trigger tube at any instant is determined by the algebraic sum of the voltage of the battery 12 and the voltages of the pair of reference voltage sources 40, 46 selectively connected in series opposing therewith, the battery voltage providing the negative bias of the combination and being the effective variable as the voltage of the battery rises and falls during the charge and discharge cycle thereof. The extent to which the battery voltage is permitted to rise and fall during the charge and discharge periods of the battery is determined by the adjustment of the reference voltage sources, as will more clearly appear from the following description of the operation of the system.

In operation, let it be assumed that the voltage of the A. C. power line 19 is maintained within desired limits by restricting the voltage variation of the storage battery 12 to the voltage range from 31 to 33 volts, for example. For this purpose, the reference voltage source 40 is adjusted to provide a reference voltage of 28 volts, which reference voltage value is equal to the difference between the lower battery voltage limit of 31 volts and the critical bias value of trigger tube 29, the tube being critically biased when the control grid 35 is 3 volts negative with respect to the cathode 33 of the tube as explained hereinabove. In like manner, the reference voltage source 46 is adjusted to a reference voltage value of 30 volts, which reference voltage value is equal to the difference between the upper battery voltage limit of 33 volts and the critical bias value of the trigger tube.

Let it further be assumed that the adjustable resistor 14 is adjusted to a value such that the storage battery is caused to discharge and supply a predetermined portion of the D. C. power required by the converter 15 when the power switches 11 and 18 are closed and the relay 24 is deenergized and that the value of resistor 21 is selected such that the battery is caused to charge when the relay is energized and at a rate substantially equal to the discharge rate of the battery.

Under these conditions, as the battery discharges, the voltage thereof falls toward the 31 volt limit. When this voltage limit is reached, the algebraic sum of the battery voltage and the voltage of the reference voltage source 40 is equal to the critical bias value of the trigger tube. The critical bias value now being applied to the control grid 35 of the trigger tube, the tube is fired. Firing of the trigger tube causes the relay 24 to operate and contacts 22 and 23 thereof close to connect resistor 21 to the battery, thus causing the battery to charge from the line 10.

Contacts 54 and 56 of relay 24 also close as the relay operates, thereby to connect the battery to the reference voltage source 46 in series opposition therewith, coupling condenser 57 serving to maintain the critical bias on the control grid of the trigger tube as contact 54 of the relay moves between the fixed contacts 53, 56 thereof. At this time, the algebraic sum of the battery voltage and the voltage of the reference voltage source 46 is such as to apply a more positive bias to the control grid of the trigger tube, which bias is 1 volt negative with respect to the cathode of the tube. Under these conditions, the trigger tube conducts on every half cycle of the power supplied thereto from secondary winding 27, thereby maintaining the relay operated and thus maintaining the charging circuit for the battery. As the battery charges, the voltage thereof rises toward the upper voltage limit of 33 volts, and when this control limit is reached, the algebraic sum of the battery voltage and the voltage of the reference voltage source 46 is equal to the critical bias voltage of the trigger tube. As the bias applied to the control grid of the tube increases negatively beyond the critical bias thereof, the tube is extinguished and relay 24 is deenergized and released, thus transferring the battery to the discharge circuit therefor and to the reference voltage source 40. When the transfer is complete, the algebraic sum of the battery voltage and the reference voltage source 40 is such as to apply a more negative bias to the control grid of the trigger tube, thus causing the battery to discharge until the voltage thereof again falls to the lower 31 volt control limit.

In the event that the power is cut off at the D. C. power line 10, the battery 12 is adapted to provide a standby supply for the rotary converter, thereby to maintain the A. C. power supply at the A. C. power line 19 and thus render the anti-torpedo system supplied thereby effectively operative for a period of time controlled by the charge in the battery.

It is to be understood that the voltage values selected in the foregoing are for purposes of illustration only and are not to be considered in a limiting sense. In practice, for example, in the embodiment of the invention as illustrated, regulation of the battery voltage may be accomplished over approximately a 10 volt range thereof, or the range may be adjusted, if desired, to less than 1 volt.

While the invention has been described in particularity with respect to an example thereof which gives satisfactory results, it will be obvious to those skilled in the art to which the invention appertains, after understanding the invention, that the same is susceptible of additional examples and variations thereof without departing from the spirit and scope of the invention as defined by the appended claims.

The invention herein defined and claimed may be manufactured and used by or for the Government of the United States of America for governmental purposes without payment of any royalties thereon or therefor.

What is claimed as new and desired to be secured by Letters Patent of the United States is:

1. In a system of voltage control, the combination of a D. C. input, a storage battery, voltage reduction means for floating said storage battery across said D. C. input at a reduction in voltage thereof, a rotary converter operatively electrically connected to said battery and adapted to provide a source of A. C. power, a load circuit supplied by said A. C. source, and an electronic control circuit supplied by the A. C. source and adapted to control the charge and discharge cycle of the battery, thereby to maintain the voltage of the battery within predetermined limits.

2. In a system of voltage control, the combination of a D. C. input, a storage battery, a rotary converter operatively connected to the terminals of said battery and adapted to provide a source of A. C. power, a load circuit supplied by said A. C. source, voltage reduction means for connecting the battery across said D. C. input at a reduction in voltage thereof and for causing the battery to supply a portion of the D. C. power required by the converter, means connectable in parallel with said first named means for causing the battery to charge from the D. C. input, and an electronic control circuit supplied by said A. C. source and controlled by the battery voltage for connecting and disconnecting said connectable means to and from the battery in parallel with said first named means when the battery voltage falls and rises to predetermined limits respectively.

3. In a system of voltage control, the combination of a D. C. input, a storage battery, a rotary converter operatively electrically connected to the terminals of said battery and adapted to provide a source of A. C. power, a load circuit supplied by said A. C. source, voltage reduction means for connecting the battery across said D. C. input at a reduction in voltage thereof and for causing the battery to supply a predetermined portion of the D. C. power required by the converter, means connectable in parallel with said first named means for causing the battery to charge from said D. C. input, a relay adapted to be energized by the A. C. source, circuit controlling means controlled by said relay and adapted to connect said means in parallel when the relay is energized, a grid controlled trigger tube for controlling the energization and deenergization of the relay as the tube is fired and extinguished respectively, and control bias means for the tube, said bias means including the battery and being adapted to fire and extinguish the tube when the battery voltage reaches predetermined limits as the battery discharges and charges respectively.

4. In a system of voltage control, the combination of a D. C. power input, a storage battery, a rotary converter operatively electrically connected to the terminals of said battery and adapted to provide a source of A. C. power, a load circuit supplied by said A. C. source, means for connecting the battery to said D. C. input in such a manner that the battery and D. C. input supply predetermined portions of the D. C. power required by the converter, means for selectively connecting the battery to the D. C. input in such a manner that the battery is caused to charge from the D. C. input and the D. C. input is caused to supply the D. C. power required by the converter, a relay for transferring the battery to and from said second named means as the relay is energized and deenergized respectively, means for energizing the relay from the A. C. source, a grid controlled trigger tube for controlling the energization and deenergization of the relay as the tube is fired and extinguished respectively, a first variable control bias adapted to be applied to the tube as the battery discharges, said first bias including the battery and being adapted to fire the tube when the voltage of the battery falls to a predetermined value, and a second variable control bias adapted to be applied to the tube as the battery charges, said second bias including the battery and being adapted to extinguish the tube when the battery voltage rises to a predetermined value.

5. In a system of voltage control, the combination of a D. C. power input, a storage battery, a rotary converter operatively electrically connected to the terminals of said battery and adapted to provide an A. C. power source, a load circuit supplied by said A. C. source, means for connecting the battery to said D. C. input in such a manner that the battery and D. C. input supply predetermined portions of the D. C. power required by the converter, means for selectively connecting the battery to the D. C. input in such a manner that the battery is caused to charge from the D. C. input and the D. C. input is caused to supply the D. C. power required by the converter, means comprising a rectifier circuit supplied by the A. C. source for providing a pair of D. C. reference voltage sources, a relay adapted to be energized by the A. C. source, a grid controlled trigger tube adapted to energize and deenergize the relay as the tube is fired and extinguished respectively, a first variable control bias adapted to be applied to said tube as the battery discharges, said first bias comprising the battery and a first of said reference voltage sources connectable in series opposition therewith and being adapted to fire the tube when the battery voltage falls to a predetermined value, a second control bias adapted to be applied to the tube as the battery charges, said second bias comprising the battery and the second of said reference voltage sources connectable in series opposition therewith and being adapted to extinguish the tube when the battery voltage rises to a predetermined value, and circuit controlling means controlled by said relay and adapted to transfer the battery to and from said second means and to and from said second and first reference voltage sources when the relay is energized and deenergized respectively.

6. In a system of voltage control, the combination of a storage battery, charge and discharge circuits therefor, a relay, a source of power for energizing said relay, a grid controlled trigger tube for controlling the energization and deenergization of the relay as the tube is fired and extinguished respectively, first and second reference voltage sources, a first control bias for said tube comprising the battery and a first of said reference voltage sources connectable in series opposition therewith and adapted to fire the tube when the battery voltage falls to a predetermined value, a second control bias for the tube comprising the battery and the second of said reference voltage sources connectable in series opposition therewith and adapted to extinguish the tube when the battery voltage rises to a predetermined value, and circuit controlling means controlled by said relay for transferring the battery between the charge and discharge circuits therefor and between said second and first reference voltage sources when the relay is energized and deenergized respectively.

7. In a system of voltage control, the combination of a storage battery, charge and discharge circuits therefor, a relay, a source of power for energizing said relay, a grid controlled trigger tube for controlling the energization and deenergization of the relay as the tube is fired and extinguished respectively, a first control bias adapted to be applied to the tube as the battery discharges, said first bias comprising the battery and a first reference voltage source connectable in series opposition therewith and adapted to fire the tube when the battery voltage falls to a predetermined value, a second control bias adapted to be applied to the tube as the battery charges, said second bias comprising the battery and a second reference voltage source connectable in series opposition therewith and adapted to extinguish the tube when the battery voltage rises to a predetermined value, and a plurality of circuit controlling means controlled by said relay and adapted to transfer the battery to said charging circuit therefor and to said second reference voltage source when the relay is energized and to transfer the battery to said discharging circuit therefor and to said first reference voltage source when the relay is deenergized.

8. In a system of voltage control for maintaining the voltage of a storage battery within predetermined lower and upper limits, the combination of a storage battery, charge and discharge circuits therefor, a grid controlled trigger tube, first and second reference voltage sources having voltage values corresponding to said lower and upper limits respectively, a first bias for said tube comprising said battery and said reference voltage source connectable in series opposition therewith and adapted to fire the tube when the battery voltage falls to said lower limit, a second bias for the tube comprising the battery and said second reference voltage source connectable in series opposition therewith and adapted to extinguish the tube when the battery voltage rises to said upper limit, and means controlled by said trigger tube for transferring the battery to the charging circuit therefor and to said second reference voltage source when the tube is fired and for transferring the battery to the discharge circuit therefor and to said first reference voltage source when the tube is extinguished.

9. In a system of voltage control for maintaining the voltage of a storage battery within predetermined lower and upper limits, the combination of a storage battery, charge and discharge circuits therefor, means including a grid controlled trigger tube for transferring the battery to the charging circuit therefor when the tube is fired and for transferring the battery to the discharge circuit therefor when the tube is extinguished, said tube having a bias value critical with respect to the firing and extinguishing of the tube, a variable control bias for controlling the firing of the tube and comprising a reference voltage source having a voltage value equal to the difference between said lower voltage limit and said critical bias value, and a variable control bias for controlling the extinguishing of the tube and comprising a reference voltage source having a voltage value equal to the difference between said upper voltage limit and said critical bias value.

10. In an electronic control circuit for transferring a storage battery between charge and discharge circuits therefor when the battery voltage reaches predetermined upper and lower limits, the combination of a trigger tube having a predetermined bias value critical with respect to the firing and extinguishing of the tube, a variable control bias for controlling the firing of the tube and comprising a reference voltage source having a voltage value equal to the difference between said lower voltage limit and said critical bias value, and a variable control bias for controlling the extinguishing of the tube and comprising a reference voltage source having a voltage value equal to the difference between said upper voltage limit and the critical bias value.

11. In an electronic circuit in which a grid controlled trigger tube is adapted to control the charge and discharge cycle of a storage battery, the combination of a first variable grid bias including said battery and adapted to be applied to said tube during the discharge period of the battery, and a second variable grid bias including the battery and adapted to be applied to the tube during the charging period of the battery, the battery voltage being the effective bias voltage variable as the battery voltage rises and falls during the charge and discharge cycle of the battery.

12. In a system of voltage control, the combination of a D. C. power input, a storage battery, a rotary converter operatively electrically connected to the terminals of the battery and adapted to provide an A. C. power source, a load circuit supplied by said A. C. source, an adjustable resistor connected in series with said battery across said D. C. input and adjusted to a value such that the battery is caused to supply a predetermined portion of the A. C. power required by the converter, a resistor adapted to be connected in parallel with said adjustable resistor and having a predetermined value such that the battery is caused to charge from the D. C. input as the D. C. input supplies the power required by the converter, a transformer supplied by said A. C. source, a rectifier circuit supplied by said transformer and including a pair of reference voltage sources, a filter for smoothing the ripples in the rectifier circuit, a regulator tube for maintaining the voltage of said reference sources within narrow limits, a relay comprising contact means and a winding adapted to be energized by said transformer, a grid controlled trigger tube for controlling the energization and deenergization of said relay as the tube is fired and extinguished respectively, a condenser connected across the terminals of said winding to prevent said contact means from chattering when the relay is energized, a pair of control biases for the tube comprising the battery and said pair of reference voltage sources selectively connectable in series opposition therewith by said contact means as the tube is fired and extinguished, said contact means being adapted to connect said resistors in parallel when the tube is fired, and a condenser for maintaining an operative connection between the battery and one of said reference voltage sources as the contact means operates.

13. In an electronic control circuit for maintaining the voltage of a storage battery supply within predetermined limits, the combination of charge and discharge circuits for the battery, a grid controlled trigger tube in which the firing and extinguishing of the tube is critical with respect to a bias of predetermined value applied thereto, means including the battery for applying a variable bias on the tube and adapted to fire and extinguish the tube when the battery voltage reaches said predetermined limits respectively, and means controlled by the tube for changing the bias thereon to a more positive value and for transferring the battery to the charging circuit therefor when the tube is fired and for changing the bias on the tube to a more negative value and for transferring the battery to the discharge circuit therefor when the tube is extinguished.

14. In an electronic control circuit for maintaining the voltage of a storage battery supply within predetermined limits, the combination of a grid controlled trigger tube in which the firing and extinguishing of the tube is critical with respect to a bias of predetermined value applied thereto, means including the battery for applying a variable bias on the tube and adapted to fire and extinguish the tube when the battery voltage reaches said predetermined limits respectively, and means controlled by the tube for changing the bias thereon to values different from the critical bias value when the tube is fired and extinguished respectively.

15. In a system of voltage control, the combination of a storage battery, charge and discharge circuits therefor, an A. C. source, a transformer supplied by said source, a rectifier circuit supplied by said transformer and including first and second reference voltage sources, a relay comprising a winding adapted to be energized by the transformer, a grid controlled trigger tube for controlling the energization and deenergization of said relay as the tube is fired and extinguished respectively, a condenser connected across the terminals of said winding to prevent said relay from chattering when the relay is energized, a first control bias for the tube comprising the battery and said first reference voltage source connectable in series opposition therewith and adapted to fire the tube when the battery voltage falls to a predetermined limit, a second control bias for the tube comprising the battery and said second reference voltage source connectable in series opposition therewith and adapted to extinguish the tube when the battery voltage rises to a predetermined value, contact means controlled by said relay for transferring the battery between the charge and discharge circuits therefor and between said reference voltage sources, and a condenser for maintaining an operative connection between the battery and the second reference voltage source as the contact means operates.

16. In an electronic control circuit in which a grid controlled trigger tube is adapted to control the charge and discharge cycle of a storage battery, a variable control bias for the tube, said bias comprising the battery and a pair of reference voltage sources adapted alternately to be connected in series opposition therewith as the battery charges and discharges, and said bias being adapted to be applied to the tube in such a manner that the effective bias on the tube at any instant is equal to the algebraic sum of the battery voltage and the voltage of the reference source connected thereto.

17. In an electronic circuit for controlling the charge and discharge cycle of a storage battery supply, the combination of means including a critically biased trigger tube for maintaining the voltage variation of the storage battery supply within a predetermined range as the battery charges and discharges, and a pair of variable control biases adapted selectively to be applied to the tube during the charge and discharge periods of the battery respectively, said pair of biases respectively comprising a pair of reference voltage sources in which the voltage values thereof with respect to the critical bias value of the tube determine said range of voltage variation.

18. In an electronic control circuit for controlling the charge and discharge cycle of a storage battery supply, the combination of means including a critically biased trigger tube for maintaining the voltage variation of the storage battery supply within a predetermined range as the battery charges and discharges, and a pair of variable control biases adapted selectively to be applied to the tube during the charge and discharge periods of the battery respectively, said pair of biases respectively comprising a pair of reference voltage sources in which the voltage values thereof with respect to the critical bias value of the tube determine said range of voltage variation, and said reference sources being adjustable at will to different settings whereby the range of voltage variation may be adjusted.

19. In a system of voltage control, the combination of a D. C. input, an electric power converter for providing a source of A. C. power from said D. C. input, means including a storage battery floated across said D. C. input for operating said converter from the D. C. input at a reduction in voltage thereof, and an electronic circuit controlled by the battery voltage for controlling the charge and discharge cycle of the battery, thereby to maintain the voltage of the battery and the regulation of the A. C. source within predetermined limits.

20. In a system of voltage control, the combination of a D. C. input, a storage battery, voltage reduction means for floating said storage battery across D. C. input at a reduction in voltage thereof, an electric power converting device operatively connected to said battery for providing a source of A. C. power, and an electronic control circuit supplied by said A. C. source and responsive to predetermined changes in the battery voltage for controlling the charge and discharge cycle of the battery, thereby to maintain close regulation of the A. C. source.

21. In a system of voltage control, the combination of a D. C. input, a rotary converter for providing a source of A. C. power from said D. C. input, a storage battery having the terminals thereof connected to the input of said converter, a two branch voltage reduction means for floating said battery across the D. C. input at predetermined reductions in voltage thereof effective to cause the battery alternately to charge from the D. C. input and discharge into said converter as the battery is transferred between the two branches of the voltage reduction means, and electroresponsive means controlled by the battery voltage and supplied by said source of A. C. power for transferring the battery between said two branches of the voltage reduction means as the battery voltage rises and falls to predetermined limits respectively during the charge and discharge cycle of the battery, thereby to maintain close regulation of the A. C. source.

22. In a system of voltage control, the combination of a D. C. input, a storage battery, a first voltage reduction means for floating said battery across said D. C. input at a reduction in voltage thereof, a second voltage reduction means connectable in parallel with said first voltage reduction means for causing the battery to float on said D. C. input at a different reduction in voltage thereof, a rotary converter operatively electrically connected to the battery and adapted to provide a source of A. C. power, and an electronic control circuit supplied by said A. C. source and controlled by the battery voltage for connecting said first and second voltage reduction means in parallel when the battery voltage reaches a first predetermined limit and for disconnecting said voltage reduction means when the battery voltage reaches a second predetermined limit, thereby to maintain close regulation of the A. C. source.

23. In a system of voltage control, the combination of a D. C. input, a storage battery, an electric power converter operatively connected to the terminals of said battery for providing a source of A. C. power, a first voltage reduction means for connecting the battery across said D. C. input at a reduction in voltage thereof sufficient to cause the battery to discharge into said power converter, a second voltage reduction means connectable in parallel with said first voltage reduction means to provide a voltage reduction of the D. C. source which causes the battery to charge therefrom, means for deriving a D. C. reference voltage from said A. C. source, and an electronic circuit including means responsive to the difference between said reference voltage and the battery voltage for connecting said first and second voltage reduction means in parallel when the battery voltage falls to a predetermined limit and for disconnecting the first and second voltage reduction means when the battery voltage rises to a predetermined limit, thereby to maintain close regulation of the A. C. source.

24. In an electronic control circuit for maintaining the voltage of a storage battery supply within predetermined limits, the combination of a grid controlled trigger tube in which the firing and extinguishing of the tube is critical with respect to a bias of predetermined value applied thereto, means including the battery for applying a variable bias on the tube and adapted to fire and extinguish the tube when the battery voltage reaches said predetermined limits respectively, and means controlled by the tube for increasing the bias thereon to a more positive value than the critical bias value when the tube is fired and for decreasing the bias on the tube to a more negative value than the critical bias value when the tube is extinguished.

25. In an electronic circuit for controlling the charge and discharge cycle of a storage battery supply, the combination of means including a grid controlled trigger tube adapted to be fired and extinguished as the bias thereon is decreased and increased respectively to a critical bias value for alternately transferring the storage battery between discharging and charging circuits therefor as the tube is fired and extinguished respectively, and a variable control bias for the tube including the battery and adapted respectively to increase and decrease the bias on the tube progressively toward said critical bias value as the battery voltage rises and falls during the charge and discharge cycle of the battery.

26. In a circuit for controlling the charge and discharge cycle of a storage battery supply, electroresponsive means for transferring the battery between charge and discharge circuits therefor as first and second variable control voltages respectively applied to the electroresponsive means reach predetermined values, a first voltage means including a first reference voltage source and the battery for applying the first variable control voltage to the electroresponsive means during the discharge period of the battery, and a second means including a second reference voltage source and the battery for applying the second variable control voltage to the electroresponsive means during the charging period of the battery, the battery voltage being the effective voltage variable as the battery voltage rises and falls during the charge and discharge cycle of the battery.

27. In a control circuit in which an electroresponsive means is adapted to transfer a storage battery between charge and discharge circuits therefor as first and second variable control voltages applied to the electroresponsive means reach predetermined values, the combination of a first variable voltage means including the battery for applying the first variable control means to the electroresponsive means during the discharge period of the battery, and a second variable voltage means including the battery for applying the second variable control voltage to the electroresponsive means during the charging period of the battery, the battery voltage being the effective voltage variable as the battery voltage rises and falls during the charge and discharge cycle of the battery.

EVERETT L. DEETER.

REFERENCES CITED

The following references are of record in the file of this patent:

UNITED STATES PATENTS

| Number | Name | Date |
| --- | --- | --- |
| 1,791,156 | Beetem | Feb. 3, 1931 |
| 1,883,492 | Bell | Oct. 18, 1932 |
| 1,885,908 | Gilson | Nov. 1, 1932 |
| 1,944,083 | Holland | Jan. 16, 1934 |
| 1,947,204 | Hoxie | Feb. 13, 1934 |